Feb. 4, 1930.　　　　J. BIJUR　　　　1,746,139
CHASSIS LUBRICATING INSTALLATION
Original Filed Aug. 9, 1922　　2 Sheets-Sheet 1
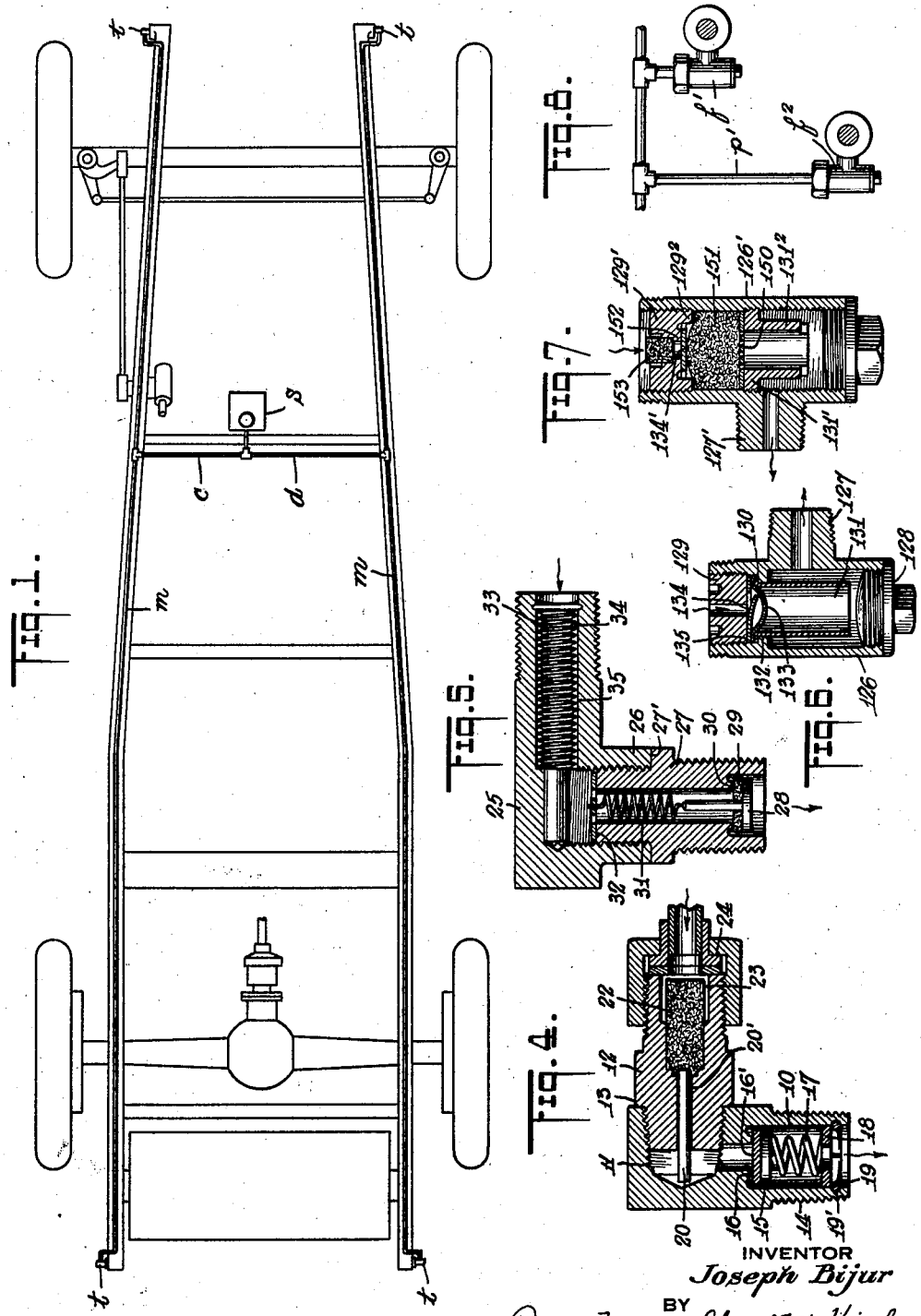
INVENTOR
Joseph Bijur
BY
his ATTORNEYS Feb. 4, 1930.  J. BIJUR  1,746,139
CHASSIS LUBRICATING INSTALLATION
Original Filed Aug. 9. 1922   2 Sheets-Sheet  2
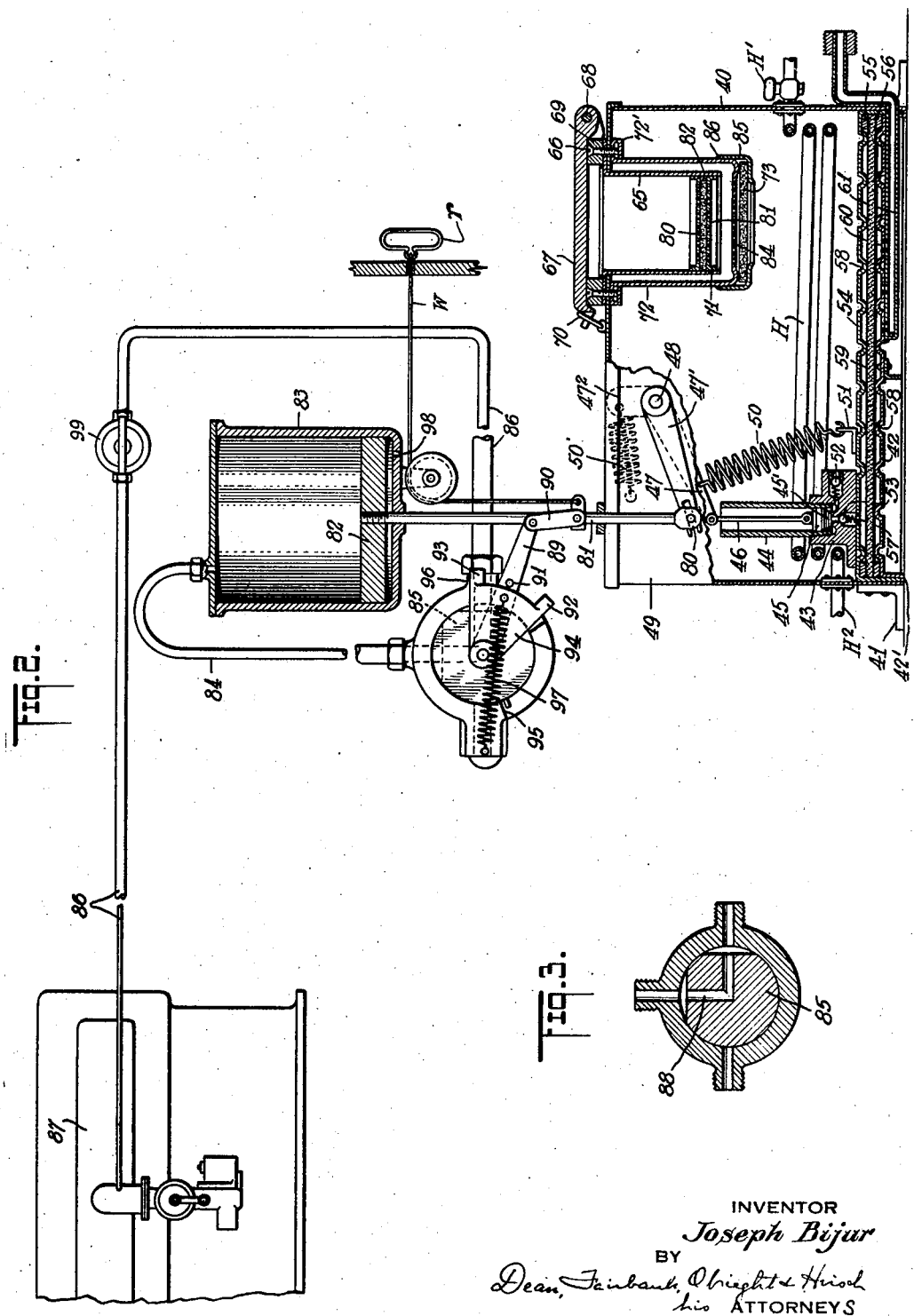
INVENTOR
Joseph Bijur
BY
Dean, Fairbank, Obrieght & Hirsch
his ATTORNEYS.

Patented Feb. 4, 1930

1,746,139

UNITED STATES PATENT OFFICE

JOSEPH BIJUR, OF NEW YORK, N. Y., ASSIGNOR TO AUTO RESEARCH CORPORATION, A CORPORATION OF DELAWARE

CHASSIS-LUBRICATING INSTALLATION

Original application filed August 9, 1922, Serial No. 580,668. Divided and this application filed June 5, 1928. Serial No. 282,957.

My present invention is primarily concerned with chassis lubrication, more especially with systems of the general type disclosed and claimed in my Patent No. 1,632,771 of June 14, 1927. In that patent, there is described and claimed a lubricating system in which the emission from a distributing pipe system caused by a resiliently discharged supply pump, is controlled by highly restricted drip plug outlets. According to the specific disclosure of the said patent, intervals of some hours may intervene between successive pump operations, the pump having sufficient volume to supply to the bearings more than their current requirements of lubricant, that is, sufficient for hours of vehicle operation after the pump has completed its discharge.

It is an object of the present invention to effect an entirely automatic emission of lubricant to the bearings and suited to the requirements thereof throughout operation of the vehicle, and from a drip plug system of the above type.

Another object is to provide a system of the above type, devoid of reduction gearing or other mechanical operating or wearing connection to the running mechanism of the vehicle and effective to apply to the pump, the power required for the desired automatic operation.

Broadly considered my system includes a lubricant supply mechanism, the pump of which is energized by a primary operating element or motor, which in turn is energized through a power transmitting connection stationary relative to the vehicle throughout operation of the latter.

Preferably the pump is caused to discharge at nearly uniform rate throughout a continuous operation of the vehicle and substantially regardless of the speed or operating conditions thereof. For this purpose the pump operating motor may be energized to a predetermined limited extent, thereupon to discharge the pump under an impulse independent of the power evolution of the engine. The motor operating connection is a stationary immovable part devoid of mechanism, not subject to wearing out or to jamming and which does not itself require lubrication. It further has the advantage of permitting disposition of the lubricant supply mechanism wherever convenient on the engine or other vehicle part.

The pump actuating motor functions automatically to commence recharging, as soon as pump discharge has been effected, to promptly complete such recharge, at the same time storing energy which upon completion of the charge promptly initiates the next discharge of the pump, the pressure applied to the pipe system in previous operations being thus substantially sustained during the short time intervals between successive pump discharges.

Preferably the pump is of relatively smaller diameter and the pump actuating motor of larger proportions for enhancing pump pressure.

The drip plugs emitting throughout vehicle operation, when supplied from a pump of the character referred to, the valves thereof need function to prevent leak, chiefly when the vehicle is stationary, at which times the valves are, of course, not subjected to the vibration, which tends to unseat them and permit leak. Incidentally, less care and precision of valve construction is required than when the valve is relied on to prevent flow or leak during the movement of the vehicle.

In a desirable system, the drip plug valves may be of loose or floating construction, said valves when made of soft material, having substantially no hindering effect on the emission from the distributing system while the line is under pressure. These valves, however, are promptly drawn to their seats by the suction engendered due to the tendency to leak, whereby entry of air is prevented and leak is inhibited.

In the specific embodiment disclosed, the pump is operated by a fluid piston motor which may be actuated from the intake of the engine. Preferably the effective connection to the motor is established by a valve automatically snapped to operating condition at the end of the discharge and to releasing position at the end of the charging stroke. By modification of the fluid piston motor the engine exhaust or cylinder compression may be utilized as the operating agency.

This application is a division of my copending application Serial No. 580,668 filed August 9th, 1922.

In the accompanying drawings in which are shown one or more of various possible embodiments of the several features of the invention, Fig. 1 is a diagrammatic view indicating chassis lubricating installation, Fig. 2 is a detail view indicating the automatic lubricant supply therefor, in vertical cross-section, Fig. 3 is a detailed sectional view of the control valve therefor, Fig. 4 is a view in longitudinal section of one embodiment of drip plug for the system disclosed, Figs. 5, 6 and 7 are views similar to Fig. 4 of other embodiments of drip plug, and Fig. 8 is a diagrammatic view showing the relation of parts with drip plugs at different levels.

Referring now to the drawings I have shown diagramatically the general layout of the chassis of an automobile having a lubricant supply unit S, illustratively on the dashboard. The distributing system includes headers $c$ and $d$, which communicates at their ends with the respective mains $m$ extending the length of the channel frames and feeding various bearings at or near which the drip plug terminals $t$ are applied. Bridging conduits (not shown) are provided, leading to similar drip plugs (not shown) at or near the corresponding bearings.

The drip plugs designated by reference character $t$ may be of any of the various embodiments disclosed in by parent application. I have here shown four of these embodiments, which are claimed by themselves in further divisional applications, Serial No. 282,958, Serial No. 282,959, and Serial No. 282,960, all filed June 5, 1928, issued respectively under Patent Nos. 1,732,828 on October 22, 1929, and 1,734,026 and 1,734,027 on October 29, 1929.

The fitting of Fig. 4 is shown elbow-shaped and comprises a support element 10 provided with a transverse tapped socket 11 into which is threaded an inlet fitting or cartridge 12 which extends at right angles to the support. The support is formed preferably of square or polygonal stock, so that shoulder 13 on the cartridge will contact snugly with one of the the flat sides. The support is threaded at its end at 14 for insertion into a bearing, bolt or other part to be lubricated. Within the support 14, I provide a check or relief valve 15, urged tight against an annular seat 16 by a coil spring 17 reacting against a perforated washer 18 maintained in place within the bore of the fitting support by a split ring 19 in groove 19'. The valve is provided with a seating portion of a material which should be yielding to compensate for irregularities in the seat, smooth to seat completely under light pressure, substantially impervious, and chemically inert to oil, and non-sticking. For imposing a high flow controlling resistance, I have shown in Fig. 4, a length of metal wire or filler 20 within the axial bore of the inlet cartridge 12. The bore 20' is preferably about $\frac{1}{16}''$ in diameter and about an inch long and the wire filler about .002'' smaller in diameter, leaving a minute restricted annular crevice or passage about the wire, affording a permanent high resistance to flow. The inlet end of the inlet cartridge, preferably has a socket within which it fitted a felt filter plug 22, the inner end of which fits snugly therein, while the outer end is preferably loose or spaced from the wall of the corresponding portion 23 of somewhat enlarged diameter, as shown. The end of the pipe line is connected to the drip plug by a suitable coupling 24.

The drip plug, it will be seen, has a fixed resistance to flow determined by the pin 20, maintained invariant by the strainer plug 22 which intercepts any small particles that might tend to clog the minute crevice or to become seated at the valve.

The embodiment of Fig. 5 comprises an integral elbow-shaped cartridge member 25 into the branch socket 26 of which is threaded a nipple fitting 27 for application to the bearing and provided with a shoulder 27' abutting the end of the socket 26. A valve 28 of diameter only little less than that of the fitting is lodged therein and has a seating surface 29 preferably identical with that of the valve in the embodiment of Fig. 4. The valve is held against smooth seat 30 at the outlet end of the nipple by means of a tension coil spring 31 extending into the bore of the nipple and secured at its opposite end to a perforated washer 32. The spring 31 serves concurrently to press the valve against its seat 30 and the washer against the end of the nipple. The drip plug restriction comprises a plug 33 of metal or equivalent hard material, of diameter substantially that of the valve 28, having a multiplicity of turns of a fine thread, preferably a double or triple thread 34, upon the surface thereof, the apex of the thread determining a diameter equal to the bore 35 of the fitting, to fit tight therein, as shown.

I have shown in Fig. 6 another construction of drip plug embodying a loose check valve, illustratively a flap valve, which may be devoid of any spring and requires only slight force to seat it. In an illustrative example of such construction, a fitting shell or cartridge element 126 is provided, having an integral laterally extending nipple extension 127 for application to the bearing or bolt, to be mounted preferably though not necessarily in vertical position. The fitting is closed at its lower end by a removable closure plug 128. Into the upper end of the fitting there is threaded an inlet plug 129 serving to clamp the flange 130 of a downwardly extending cylindrical tube 131 against an inwardly extending ledge 132 formed in the cartridge. The free end of the tube 131 is above the plug 128 and below the bore of the nipple 127. Between plug 129 and ledge 132, a bowl-shaped piece 133 of parchment, calf skin or similar high-resistance porous material is clamped, said bowl performing a resistance function similar to that of the restriction pin in Fig. 4.

In the present embodiment, I have shown between the bowl-shaped element 133 and the plug 129, a flap check or non-return valve of leather or thin spring steel, constituting a tongue 134 struck out from a disk, the periphery 135 of which is engaged by the plug 129 to clamp said disk, the bowl 133 and the flange 131 against the ledge 132.

In Fig 7 is shown a modification of drip plug in which the restriction is illustratively shown as a compacted plug of felt 151, cotton or the like, disposed directly within the bore of a cartridge 126' similar to that of Fig. 6. The restriction plug is compressed in place within the cartridge between an inlet plug 129' and a nut 131' provided with an integral dispensing sleeve 131² extending downward below the bore of nipple 127' to form an oil seal as in the embodiment of Fig. 6. A perforated disk 150 is interposed between the felt restriction mass and the nut 131', through which pressure is evenly applied to the restriction mass, forcing it against a projecting flange 129² on the inlet plug 129', the felt mass bulging under the pressure into the depression within the flange 129², to press a disk non-return valve 134' therein against its seat 152 in said inlet plug. Preferably the inlet end of inlet plug 129' is provided with a strainer plug 153 of felt, serving to intercept any solid particles carried with the oil, which might otherwise become lodged at and impair the seating effectiveness of the valve or ultimately clog the felt plug restriction.

In operation, the lubricant will be forced past the strainer plug 153 to unseat the non-return valve 134' and through the compacted restriction mass 151, where the pressure is absorbed, and past the oil seal 131² through the nipple to the bearing. Entry of air is prevented by the oil seal and also by the non-return valve 134' which is seated firmly by any return impulse of the oil.

Obviously, the strainer 153 may be provided in identical relation and for the same purpose in a corresponding socket in the inlet plug 129 of the embodiment of Fig. 6. Such strainer may also be employed in the embodiment of Fig. 5.

Since a valve of leather or other limber material might droop so far away from the seat as to be urged away from, rather than toward its seat by the suction flow described, it is important to provide means to limit the valve deflection, and this is accomplished in the specific embodiments shown by the resistance members 133 and 151.

It will be apparent that with the unit of Fig. 6 or Fig. 7 in preferably vertical position, oil will pass therefrom only when it fills the cartridge at least up to the level of the bore of nipple 127, and the cartridge is, therefore, always full at least to that level. The oil thus forms a trap, since it fills the cavity between plug 128 and the lower end of tube 131 through which air must enter before venting or draining is possible.

It will be understood that in lieu of any of the four embodiments of drip plug herein disclosed, various other constructions shown in my parent application may be used to advantage, and that the valve of one embodiment may be substituted for that of another.

The pump unit may comprise a sheet metal box or reservoir 40 having lugs 41 by which it can be secured in any desired place upon the vehicle, preferably in front of the dashboard. The bottom 42 of the box may be raised as indicated and formed integral with the sides, from a single blank of sheet metal reversely bent to form a supporting flange 42'. Upon the bottom 42 is secured the pump which comprises a base casting 43 within the upper end of which is threaded an open-ended upstanding cylinder 44. The piston 45 is joined by a connecting rod 46 to a lever 47 mounted upon a rock shaft 48 extending through the side walls 49 of the casing, preferably at an elevation higher than that of the lubricant within the reservoir, to dispense with the need for packing. The pump actuating means to be hereinafter described is operatively connected to a lever 47' on the projecting end of rock shaft 48.

A coil spring 50 connects the lever 47 to a metal angle strip 51 extending across the bottom 42, thereby normally maintaining the piston at the bottom of its stroke, with its lower leather covered end 45' sealing the outlet. Preferably the spring 50 is mounted at such inclination, that when the piston is at the bottom of its stroke, the length of said spring extends at right angles to the length of lever 47, so that the leverage of the spring increases from a minimum, when the piston is at the upper end of the stroke, to a maximum as it reaches the lower end. Thus, the decrease in the tensile force of the spring as it contracts in drawing the piston downward is substantially compensated for by the increase of effective lever arm about rock shaft 48, so that the piston will exert throughout the length of its stroke, a substantially constant pressure upon the oil therebelow. The pump base has a spring-pressed ball check valve 52 in the side, past which the oil is sucked by the raising of the piston and a similar spring-pressed relief valve 53 opens upon the downward stroke of the piston for ejection of the lubricant therethrough.

To avoid possible clogging of the drip plugs by minute solid particles carried with the oil, a relatively dense filter, preferably of sole or similar heavy leather is embodied in the reservoir. Since the drip plugs offer resistance to flow so high that the oil oozes therethrough but slowly under the applied pressure, it is feasible to interpose in the path of oil flow between the pump and the pipe line an efficient filler which may be so dense as to be itself of substantial flow resistance.

In a preferred embodiment, the dense filter is of large area preferably equal to that of the reservoir bottom and is clamped against said bottom 42 by an auxiliary flanged clamping plate 54 telescoped into the base of the reservoir, gaskets 55 and 56 being interposed to firmly grip the periphery of the filter, the pump cylinder communicating with the filter head through aperture 57. To prevent the possibility of tearing or rupturing the large-area filter under the substantial pressure applied thereto in the operation of the pump, it is preferred to form both the bottom 42 of the reservoir and the clamping plate 54 with registering pressed bosses 58 to firmly retain the filter pad 59 against deflection at a multiplicity of distributed points, as shown. The lubricant from the filter is fed to the headers $c$ and $d$ through a pipe 61, preferably flattened and soldered to the bottom 42 of the reservoir and extending through the flange 42' communication from the filter head to said pipe being established through a series of registering apertures 60 through the bottom 42 and the upper surface of pipe 61.

It is apparent that the large dense filter 59 may become clogged after a relatively short period of use, if it is supplied with dirty oil. It is, accordingly, desirable to remove the coarser particles from the oil before it is drawn into the pump and forced through the dense filter.

For this purpose, I provide a strainer filter cup 65, secured by screws 66 which are removable to permit withdrawal of the cup for cleaning. The bottom of the cup is raised, as shown, and comprises a pair of apertured flanged screen plates 80 and 81 preferably soldered thereinto, between which is pressed a filtering pad 82. The rim of the strainer cup has preferably soldered thereto, an annulus 69 to afford the necessary thickness for the screws 66. The filling cup is normally maintained close by means of a cover 67 pivoted as at 68 to annulus 69 and maintained closed by a hasp 70.

There is no likelihood in cleaning, of gathering any material quantity of dirt by temporarily standing the filter cup upon its base on the floor of the garage or other unclean place, since the area of the bottom is preferably raised from contact therewith by the rim 71.

A filter cup 72 provided with a filter pad 73 is preferably provided, permanently secured by soldering about the filling opening in the reservoir 40, thus preventing the entry of dirt or dust even when the filling cup 65 is removed. As shown, the screws 66 extend only partway through the thickness of flange 72' so that no dust can enter through the small screw holes otherwise left open by removal of the filling cup. The filter cup, as shown, has a bottom 84 apertured as shown against which there is pressed the filter pad 73 by means of a cap ring 85 soldered in place as at 86.

To charge the reservoir, the cover is thrown back and oil is poured in through the strainer cup 65 by which any solid particles are intercepted, and in its passage through filter cup 72, finer particles are intercepted by filter pad 73, so that only clean oil will enter the pump reservoir and cylinder. The filter pad 73 is of such texture as to permit seepage of the lubricant therethrough at a slow but not unduly slow rate, the dense filter 59 being relied upon to abstract any minute remaining particles of dust when the oil is forced therethrough by pressure applied at the pump 44.

If the same grade of oil were used in my system winter and summer, it will be obvious that by reason of the much greater viscosity of the oil at low temperatures, the feed of lubricant to the bearings may be greatly retarded, particularly at the dense filter 59 and at the various drip plugs or obstructions. I compensate for this by mounting the reservoir and pump as shown, in the vicinity of the engine, so that the supply of oil therein, will be maintained warm winter and summer, as long as the engine is running, whereby regardless of the season or latitude, oil of substantially uniform viscosity would be forced through the dense filter 59.

Furthermore, it is desirable in many cases to provide a heating coil within the reservoir 40 and extending as shown, about the inner walls thereof and communicating preferably with the exhaust, or, if desired, with the water jacket, so that warm gases or water supplied therethrough will maintain the oil in the reservoir warm. Preferably a cock H' is provided adjacent the inlet to the coil H to shut off the supply of heated fluid in warm weather. The inclination of the turns of the heating coil is preferably such that any water condensed in the exhaust will readily flow out by gravity through the delivery or drain opening H².

In addition to or in lieu of the temperature compensating heating coil described, I may provide an auxiliary coil spring 50' attached at one end to a lever arm 47² affixed upon the protruding end of rock shaft 48. The free end of spring 50' may be anchored to a hook (not shown) to provide additional spring pressure in winter for forcing the pump piston 45 downward to compensate for the increased viscosity of the oil.

The pump and reservoir apart from the lubricating system or from the automatic pump charging means, is not claimed herein, but is the subject-matter of my parent application. The system embodying the temperature adjustment feature is not claimed herein but is included in the subject matter of another division of my said parent application, namely Serial No. 330,720, filed January 7, 1929.

Automatic charging of the pump is effected by utilizing power generated in the operation of the engine. The intake suction, the exhaust pressure or the compressed charge within a cylinder, illustratively may be utilized for this purpose. In certain of the claims, I employ the term "mixture conduit" as generic to all parts of the course of the mixture through the motor, both before and after explosion. Each time that the pump plunger has executed an effective discharge stroke, it is automatically connected to return it to the top of the stroke, for again charging the pump and continuing the lubrication.

Referring to the drawings, which show a preferred intake-manifold vacuum-operated embodiment, the lever 47' rigidly connected to the exposed end of rock shaft 48, is associated by a pin and slot connection 80 with the lower end of the plunger 81 of a piston head 82, sliding up and down in the cylinder 83 of a vacuum pump above the reservoir. The top of cylinder 83 is closed tight and from it a pipe 84 extends to the automatic valve 85, and thence by way of pipe 86 to the intake manifold 87. The automatic valve has an L-shaped port 88, which in one position, connects the vacuum power cylinder 83 with the intake manifold and in the other to atmosphere. A lever 89 linked as at 90 to the stem 81 of the pump plunger is pivoted on the axis of the valve 85. The lever is provided with a pin 91 to strike stop 92 when moved toward the left and stop 93 when moved to the right. Both stops are on a quadrant 94 fixed to the valve 85 to snap the valve against stop 95 and stop 96 respectively on the valve casing, by the action of a coil spring 97 which connects the quadrant and the valve to the valve casing and functions when shifted past the axis of the valve. In the position shown, the plunger is down and lever 89 has shifted spring 97 past the axis to snap the valve 85 against stop 95 to establish the valve connection from the intake manifold to the power cylinder 83. Suction is thus applied to the power cylinder above piston 82, which is thereby elevated, air being admitted through vent hole 98 provided for this purpose, in the bottom of the power cylinder. When the power piston head reaches the top of its stroke, the lever 89 linked to the stem has reached a position where the pin 91 thereon presses against the stop 93 of the quadrant on the valve and throws it over dead-center, so that the spring snaps it to its upper position against stop 96, cutting off the vacuum and admitting atmospheric pressure to the top of the piston head through passage 84, whereupon the spring in the pump slowly returns the piston 82 to lowermost position in forcing lubricant slowly through the drip plugs to the bearings.

The various elements of the reservoir and of the pump operating unit therefor, have no unprotected openings therein, and, accordingly, will exclude dirt and dust from the operating parts and from the oil stored in the reservoir. The strainer cup and the filter cup intercept any solid particles admitted with the oil, so that the system is well guarded against derangement by impurities.

A wire $w$ connected to the plunger 81 has a hand ring $r$, accessible from the front of the dashboard, affording auxiliary means to charge the pump by hand.

A hand-operated control valve 99 of conventional form may be provided in the pipe connection 86 from the intake manifold to the automatic valve 85, to place the system out of operation, if desired.

The apparatus described is particularly suitable though not limited to the lubrication of vehicles where continuous or non-manual lubrication is desirable, since, as above described, it substantially assures a continuous slow lubrication of all chassis bearings, while the vehicle is running, the pump being immediately re-charged automatically a soon as it is discharged.

It will be understood that the oil propulsive force exerted by the lubricant supply installation and the resistance to flow imposed by the drip plugs are so correlated that lubricant is propelled to the bearings throughout the substantially continuous discharge of the system, and in accordance with the current running requirements of the bearings, without deficiency on the one hand or excessive over-oiling on the other. As soon as the pump has made an effective discharge, the pump charging agency is re-connected and the pump is promptly re-charged. As soon as the charge has been completed, discharge is resumed. The interval between the end of any pump discharge and the commencement of the next pump discharge is thus so short that the pressure on the distributing system has not had sufficient time to subside after a pump discharge, before the next pump discharge is under way. Valve 53 prevents the application of suction to the pipe line during the charging operation.

Though the engine is the agency that operates the pump, yet no dangerously excessive pressure is ever applied to the distributing system, the pump discharge spring serving as the pressure limiting means.

The loose or floating check valves such as shown in Figs. 6 and 7 are particularly advantageous in a system such as that here disclosed and claimed, in which pressure is continuously applied to the pipe line throughout vehicle operation. Such loose or floating drip plug valves impose little or no counterpressure, to oppose flow to the bearings. Yet though devoid of seating springs, these valves are effective to prevent leak from the pipe line, while the vehicle is stationary, at which times they are not subjected to a vibration which tends to unseat them.

More particularly, when the engine or vehicle has stopped moving, the tension due to the weight of oil in a distributing pipe, as at $p'$ (Fig. 8) extending downward from a drip plug $f'$ equipped with a check valve of the type shown in Figs. 6 and 7, would create a suction thereon sufficient to effect closure thereof, the check valve 53 at the pump preventing such small tension from draining lubricant from the pump. Venting being thus precluded, no leakage or drainage can occur and emission takes place through one or more drip plugs $f^2$, only so long as the distributing system is under pressure.

The restriction being beyond the valve, holds oil in contact therewith after the system has ceased feeding, so that the suction due to the lubricant in the drooping pipe lengths, has first to pull oil through the crevice between the valve and the seat,—a slow operation,—before air can go through. Oil helps seat the loose valve, in fact, insures its being pulled to its seat at all. Being viscous, oil resists being drawn through the crack between the valve and its seat by the very light force available.

It will be understood that while the drawings show the invention embodied in a chassis lubricating system, the invention is of broader application to the lubrication of other installations or mechanisms, and in its broadest aspects may be applied to the distribution, to a plurality of distributed delivery points, of liquids other than lubricant.

I claim:—

1. A central lubricating system including distributing piping having highly restricted drip plugs in the various outlet branches thereof determining the distribution to the bearings, a reciprocating pump, means for operating the latter to force lubricant therefrom into the inlet of the pipe system, and means to initiate and complete each pump charging stroke before the pressure on the pipe line due to previous pump operations has subsided, both the means for charging and the means for discharging the pump being energized by power derived from the lubricated mechanism.

2. In a central lubricating system, the combination of distributing piping having drip plugs in the various outlet branches thereof, a reciprocating plunger force pump at the inlet of the system, means operating said pump to inject lubricant therefrom, thereby to apply pressure to the distributing piping, and means correlated with the lubricated mechanism to automatically charge said pump promptly after discharge thereof and to complete the charging stroke and allow the discharge to recommence before the pressure in the pipe line has subsided.

3. The system as claimed in claim 2 in which the pump charging means comprises a plunger lifting unit above the pump plunger subjected to impulse directly applied thereto in the movement of the vehicle and in which the pump is discharged by energy stored in the lifting action of said unit.

4. In a chassis lubricating system, the combination of distributing piping leading to various bearings and having drip plug outlets, a force pump at the inlet to the system having a discharge-spring retarded in its propulsive action by the drip plugs and the intervening body of oil, and means automatically actuated in response to the running of the vehicle to promptly reverse and charge the pump after a discharge thereof and after completing the charge, to thereupon release the pump for spring discharge thereof, all in time intervals so short as to maintain substantially continuous pressure on the pipe line.

5. A chassis lubricating system including distributing piping having outlet branches leading to the bearings, drip plugs in said branches, having check valves adapted to open when the line is under pressure and to close after pressure is discontinued from the pipe line, a reciprocating pressure pump connected to the line, means for resiliently discharging said pump, and means for automatically applying power evolved in the operation of the vehicle, to promptly initiate and complete the charge of the pump after each discharge thereof and to be promptly disconnected from the charged pump to permit discharge thereof, whereby pressure is applied to the piping substantially continuously throughout vehicle operation and emission is determined by the drip plugs.

6. A central chassis lubricating system comprising distributing piping having drip plugs controlling emission therefrom, a spring-discharging pressure pump for feeding the pipe line at a rate adapted to be retarded by the drip plugs and to cause the latter to emit at rate corresponding to current requirements of the bearings, motive means energized from the running vehicle to effect the charging stroke of the pump against the resistance of the discharge spring, during the persistence in the piping system of pressure applied thereto in the previous operation, and means for automatically disconnecting the motive means from the pump upon completion of the pump charging stroke.

7. A central chassis lubricating system including distributing piping having drip plug outlets, a pump at the inlet and motive means for effecting charge of said pump automatically by power generated in the vehicle and storing energy for discharging said pump, said motive means effecting prompt reversals of the pump and completing the charge in one stroke before the pressure has subsided in the pipe line, thereby to maintain substantially continuous emission from the pipe line throughout vehicle operation.

8. In a chassis lubricating system, the combination of distributing piping having drip plug outlets, an automatic supply installation at the inlet to said piping, said installation including a reservoir, a resiliently discharging pressure pump therein, a motive unit for producing the charging stroke of said pump, said motive unit arranged for transmitting to the pump, energy directly applied thereto in the operation of the vehicle, and including tripping means for automatically disconnecting the pump after its charge has been completed, the unit being constructed and arranged to complete the pump charge during the persistence in the piping of pressure applied thereto in the previous operation.

9. In a centralized installation for lubricating the bearings of a machine, in combination, a source of lubricant, piping connecting said source to the bearings, means energized from the operating machine intermittently to apply pressure to lubricant from said source with but a short interval between the end of each impulse and the beginning of the next, and means in advance of each bearing to absorb the pressure upon the lubricant for slow flow of lubricant to the bearings, whereby lubricant will be continuously supplied at a slow rate to the bearings while the machine is operated or pending the duration of the pressure upon the lubricant.

10. In a centralized lubricating installation for a motor vehicle, in combination, an engine having a conduit for the mixture including an intake manifold, engine cylinders and an exhaust, a lubricant station, means measuring off a predetermined charge of lubricant at said station, conduits from said station to the bearings of the vehicle, means for exerting pressure upon said measured charge of lubricant, means across the flow of lubricant to the bearings for absorbing pressure for slow feed of the lubricant thereto, and motor means of diameter much larger than that of said measuring means, connecting said source to a portion of said mixture conduit to produce the pressure for propelling the lubricant.

11. A pump, comprising in combination, a cylinder, a piston therein, a spring to urge said piston to discharged position, an operating head for said piston, means for changing the pressure on one side of said operating head to effect charging of said cylinder against the resistance of said spring, a two-way valve for operatively connecting said pressure means in one position and in the other position for communicating with the external atmosphere to equalize the pressures on opposite faces of the operating head for permitting the spring to discharge the cylinder.

12. In a lubricating installation for a motor vehicle, in combination, an engine operated lubricant pump normally urged to discharged position, an operating head for said pump, piping for connecting one side of said head to a portion of the mixture conduit of the engine, a valve in said piping to transmit power for raising the head to charge the pump, said valve when disconnected establishing communication of the piping to the external atmosphere for equalization of the pressure on opposite sides of the head to allow discharge of the pump.

13. A chassis lubricating system including distributing piping having drip plug outlets, a resiliently discharging lubricant pump at the inlet, means for automatically charging said pump following each discharge thereof, throughout vehicle operation, in order to maintain a sustained pressure upon the pipe system and sustained emission therefrom, said drip plugs including loose valves, inhibiting leak from the pipe system, when the vehicle is out of operation, and after pressure has ceased.

14. A chassis lubricating installation including the combination of a reciprocating pump, a distributing system having restricted drip plug outlets, means alternately to charge and discharge said pump, the charging stroke being effected automatically by power derived from the operating vehicle, the discharge stroke by power stored during the charging stroke, the intervals between discharges being so short as to maintain substantially continuous pressure on the distributing system, said parts being constructed and arranged to limit the maximum pressure upon the system.

15. A chassis lubricating installation including a reciprocating plunger pump, a distributing system having restricted drip plug outlets, means alternately to charge and discharge said pump, the charging stroke being effected by power evolved in the normal operation of the vehicle, and a spring energized in said charging stroke and applying the discharging impulses to the pump plunger, thereby limiting the maximum pressure upon the line, the intervals between discharges being so short as to maintain substantially continuous pressure on the distributing system.

16. A lubricating installation comprising the combination of a plurality of distributed bearings, a single pressure pump, a distributing system communicating therewith and extending to said bearings, drip plugs in the path of flow of lubricant to and in the vicinity of the various bearings, said drip plugs serving to absorb pressure in the lubricant propelled by said pump, and flow resistant filter means adjacent the outlet of the pump and in the path of flow of the lubricant therefrom and of effective area many times as great as that of the combined cross-sectional area of the drip plugs, to remove solids from the lubricant in its path of flow to the lines.

17. A lubricating installation comprising the combination of a plurality of distributed bearings, a single pressure pump, a distributing system communicating therewith and extending to said bearings, drip plugs at the outlets of said system and in the vicinity of said bearings, each of said drip plugs including a non-return valve, and flow resistant filter means to remove solids in the lubricant in its path of flow from the pump into the distributing system.

18. In a lubricating installation, the combination of a plurality of distributed bearings, a single pressure pump, a distributing system communicating therewith and extending to said bearings, drip plugs controlling the exit from said lines, a flow resistant filter of surface area much larger than the combined cross-sections of the drip plugs and adjacent the exit port of the pump, through which the pump forces its discharge, and strainer means at the inlets of the drip plugs to intercept solids collected in the line of flow.

19. A central installation for lubricating various bearings of a motor vehicle and including a pipe system with drip plug outlets to the bearings, and a supply unit for injecting lubricant under pressure into said system, said supply unit including a spring discharging pump, a suction actuated charging member therefor adapted to be connected by means of a pipe with respect to the intake manifold of the engine, a valve for establishing communication on the part of said charging member alternately with the intake manifold and atmosphere, said valve being actuated by a moving part of said member in both charging and discharging operation thereof.

20. A central chassis lubricating system comprising a lubricant reservoir, a reciprocating pump associated therewith, a distributing conduit system connected with said pump and having highly resistant flow proportioning branches leading to the various bearings, a reciprocating motor co-ordinated with said pump to reciprocate said pump, in phase relation therewith, and means stationary relative to the vehicle throughout operation thereof, serving as a transmission member for conveying the pump charging impulse from the vehicle to the motor to store energy for pump discharge, said motor being large compared to the pump operated thereby for enhanced pump pressure.

21. A central chassis lubricating system comprising a lubricant reservoir, a reciprocating pump associated therewith, a distributing conduit system connected with said pump and having branches with flow proportioning restrictions governing emission to the bearings, a reciprocating motor connected to move said pump in phase relation therewith, means stationary relative to the vehicle throughout operation thereof serving as a transmission member for conveying a sudden mechanical stress to energize the motor after each pump discharge, said elements being constructed and arranged for discharge of the pump at pressure substantially constant throughout the stroke thereof, said motor being large compared to the pump operated thereby for enhanced pump pressure.

22. A central installation for lubricating various bearings of a motor vehicle and including a pipe system with drip plug outlets to the bearings, and a supply mechanism for injecting lubricant under pressure into said system substantially continuously at nearly uniform rate throughout continuous operation of the vehicle and substantially unrelated to the speed thereof, said mechanism including a pump, a motor for operating the latter in phase relation therewith, means stationary relative to the vehicle throughout operation thereof serving as a transmission member for conveying a pump operating impulse from the vehicle to the motor, said motor being large relative to the lubricant propulsion element of the pump for enhanced pump pressure.

23. In a chassis lubricating system, the combination of a lubricant supply mechanism including a reservoir and an associated reciprocating pump of diameter much smaller than that of said reservoir and having a vertical plunger with an inlet submerged in said reservoir, said supply mechanism completely enclosed and maintaining the oil contents thereof free from contamination with foregn matter, a distributing system supplied from said pump and having highly resistant flow proportioning outlets leading to various bearings, a pump energizing motor above said reservoir of volume larger than that of said pump, and means stationary relative to the vehicle throughout operation thereof serving as a transmission for conveying pump energizing impulses from the vehicle to the motor.

24. An automatic central lubricating system including a source of lubricant, an oil pressure applying device associated therewith, a distributing system supplied from said device and having highly resistant flow controlling outlets to various bearings, said device constructed and arranged for energization thereof directly from a non-rotary part on the operating vehicle, said device having means associated therewith for limiting the maximum pressure exerted thereby, substantially regardless of the speed or power consumption of the vehicle and manually adjustable means for varying the maximum discharge pressure.

25. In a central chassis lubricating system, an oil reservoir having a normally closed filling opening and being otherwise completely closed to exclude foreign matter, said reservoir having an associated pump, and filter means to intercept foreign particles from the pump output, a distributing conduit system supplied from the pump and having highly restricted flow proportioning outlet branches leading to the bearings, a motor, and a connection stationary relative to the vehicle throughout operation thereof, serving as a transmission member for conveying pump energizing impulses from the vehicle to the motor.

26. A chassis lubricating system including a lubricant supply installation, comprising a reservoir a reciprocating pump of diameter much smaller than that of said reservoir and associated in a unit therewith, means to exert substantially uniform propulsive pressure from beginning to end of the discharge stroke thereof, said means including an operating rod connected at one end thereof with the pump and a motor connected to the other end of said rod and having an impelling member much larger than that of said pump, and a connection stationary relative to the vehicle throughout operation thereof, serving as a transmission member for conveying pump energizing impulses from the vehicle to the motor.

27. A chassis lubricating installation including a conduit system having outlet branches provided with flow proportioning restrictions, constructed and arranged to maintain the system substantially filled with lubricant, pump means for automatically feeding lubricant into the system and causing consequent emission to the bearings during vehicle operation, operating instrumentalities for said pump including pump discharge means, and means whereby energy from the vehicle effects prompt re-energization of the pump discharge means upon completion of the operation thereof, said pump discharge means constructed and arranged to exert a nearly constant pressure under various vehicle operating conditions, whereby the pump during operation, will rapidly refill a partially empty pipe system and will thereafter operate more slowly in accordance with the opposition imposed by the flow proportioning restrictions at the outlets of the substantially lubricant filled system.

28. A chassis lubricating system comprising a source of lubricant, a pump associated therewith, a distributing system supplied from said pump and having branches with flow proportioning highly resistant outlets, said outlets constructed and arranged to maintain the distributing system substantially filled with oil at all times, means deriving energy from the operating vehicle rapidly to energize said pump means, said filled distributing system imposing a load on the discharging pump for pump discharge stroke relatively slower than the charging stroke and alternative means for energizing said pump by a manual operation.

Signed at New York, in the county of New York and State of New York, this 25th day of May, A. D. 1928.

JOSEPH BIJUR.